Aug. 6, 1968    E. J. HERBENAR    3,395,442
METHOD FOR PRELOADING AND RETAINING COMPONENTS IN A HOUSING
Filed March 8, 1967                    4 Sheets-Sheet 1
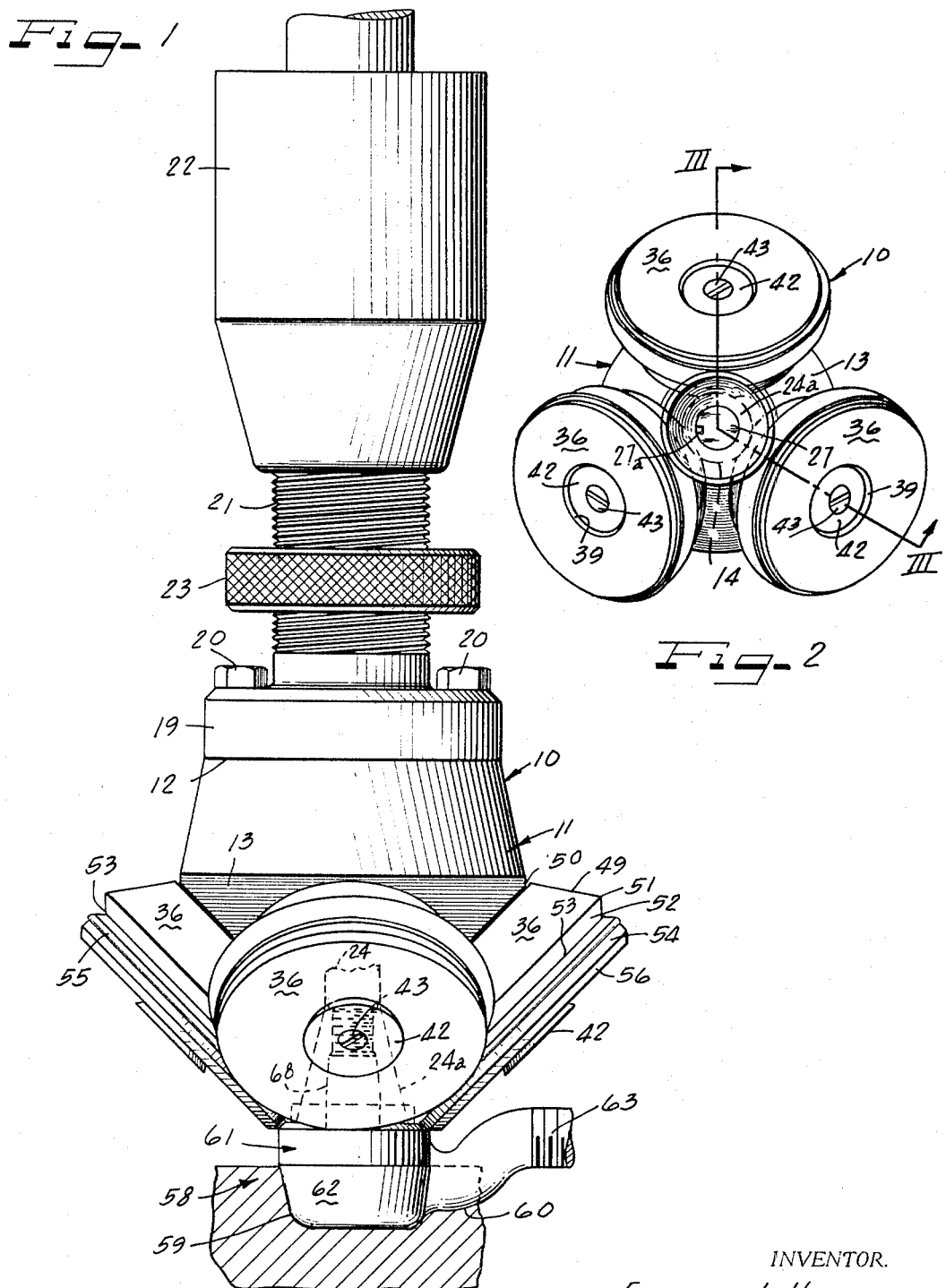
INVENTOR.
EDWARD J. HERBENAR
BY    ATTORNEYS

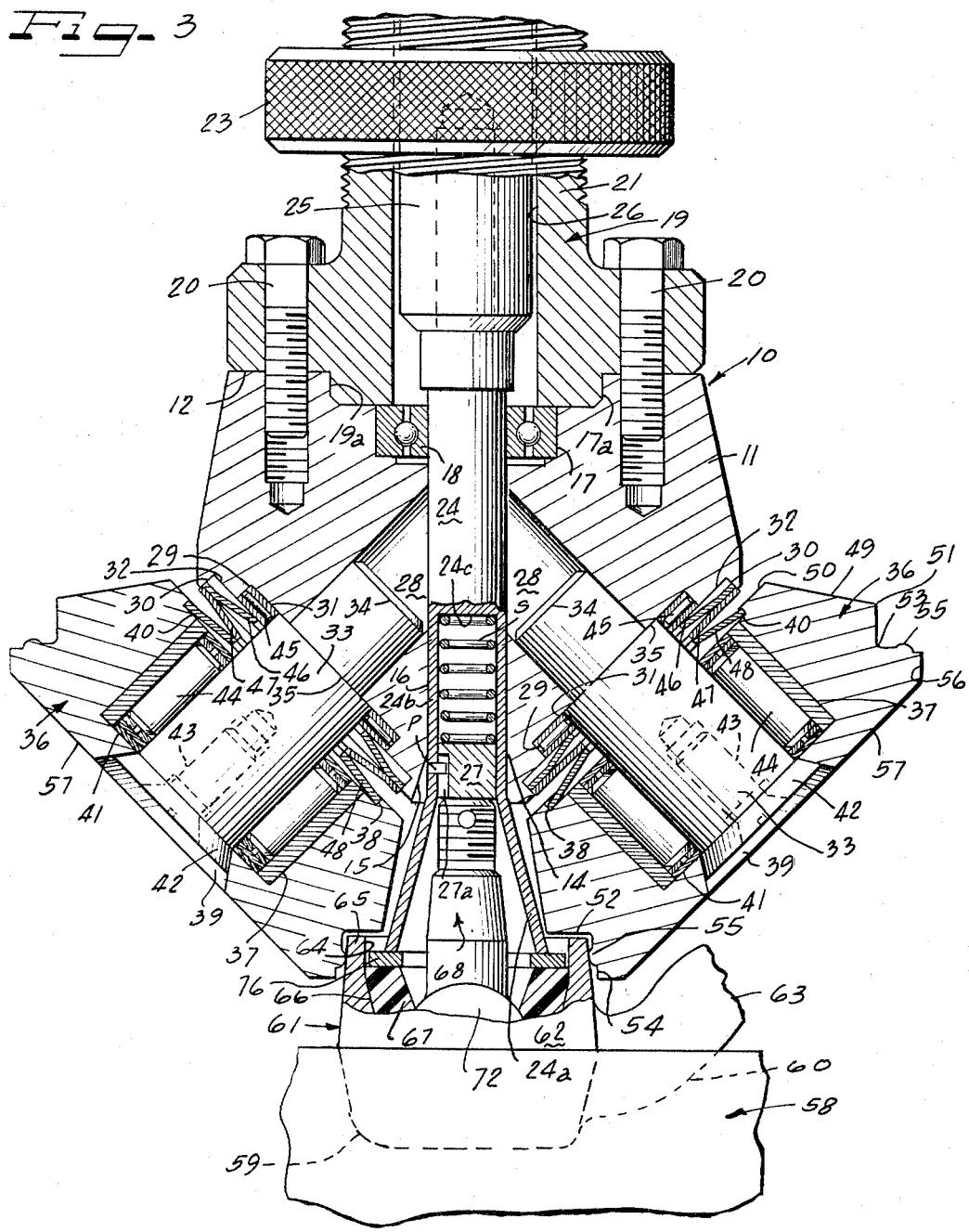

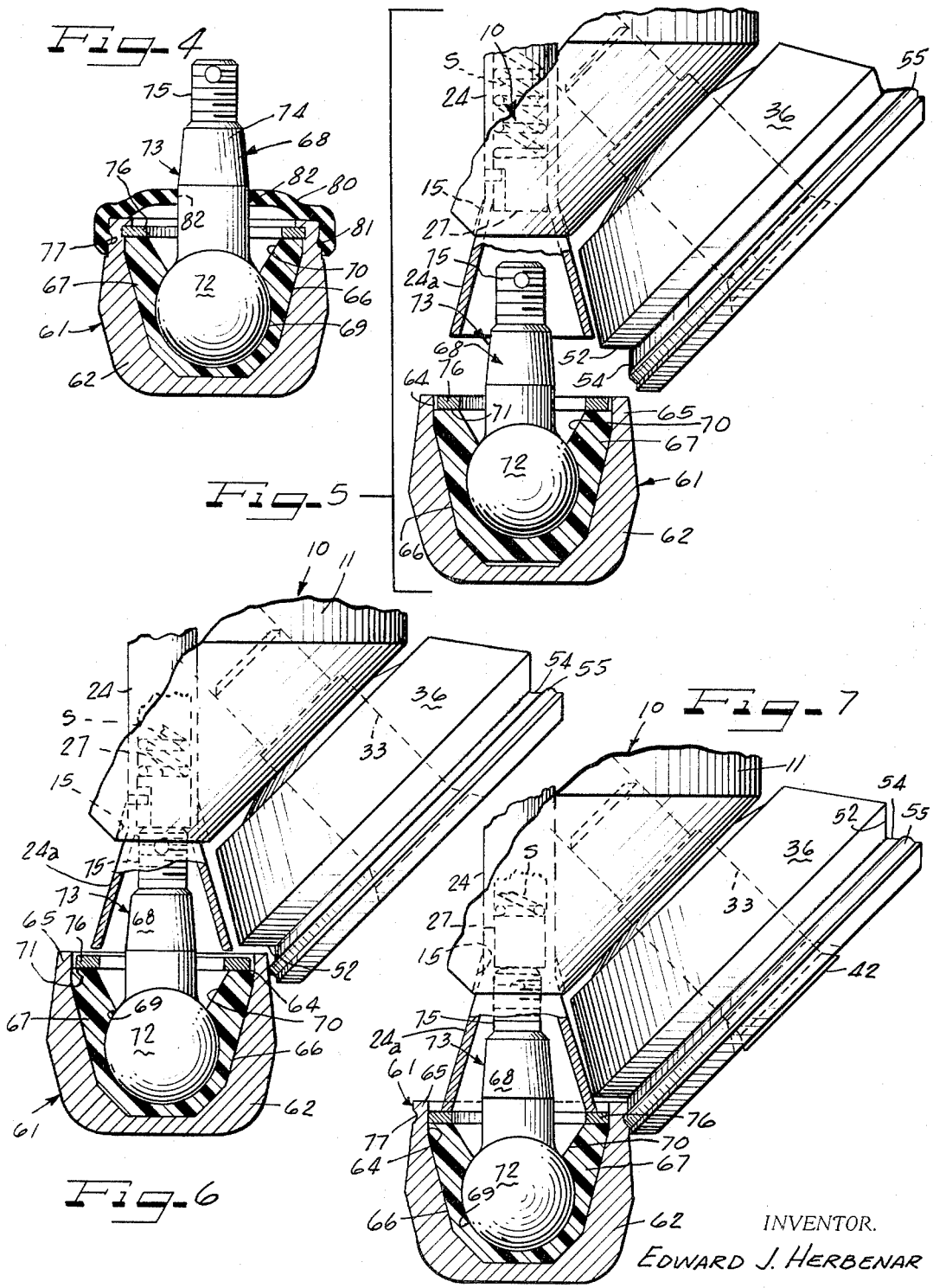

Aug. 6, 1968  E. J. HERBENAR  3,395,442
METHOD FOR PRELOADING AND RETAINING COMPONENTS IN A HOUSING
Filed March 8, 1967  4 Sheets-Sheet 4
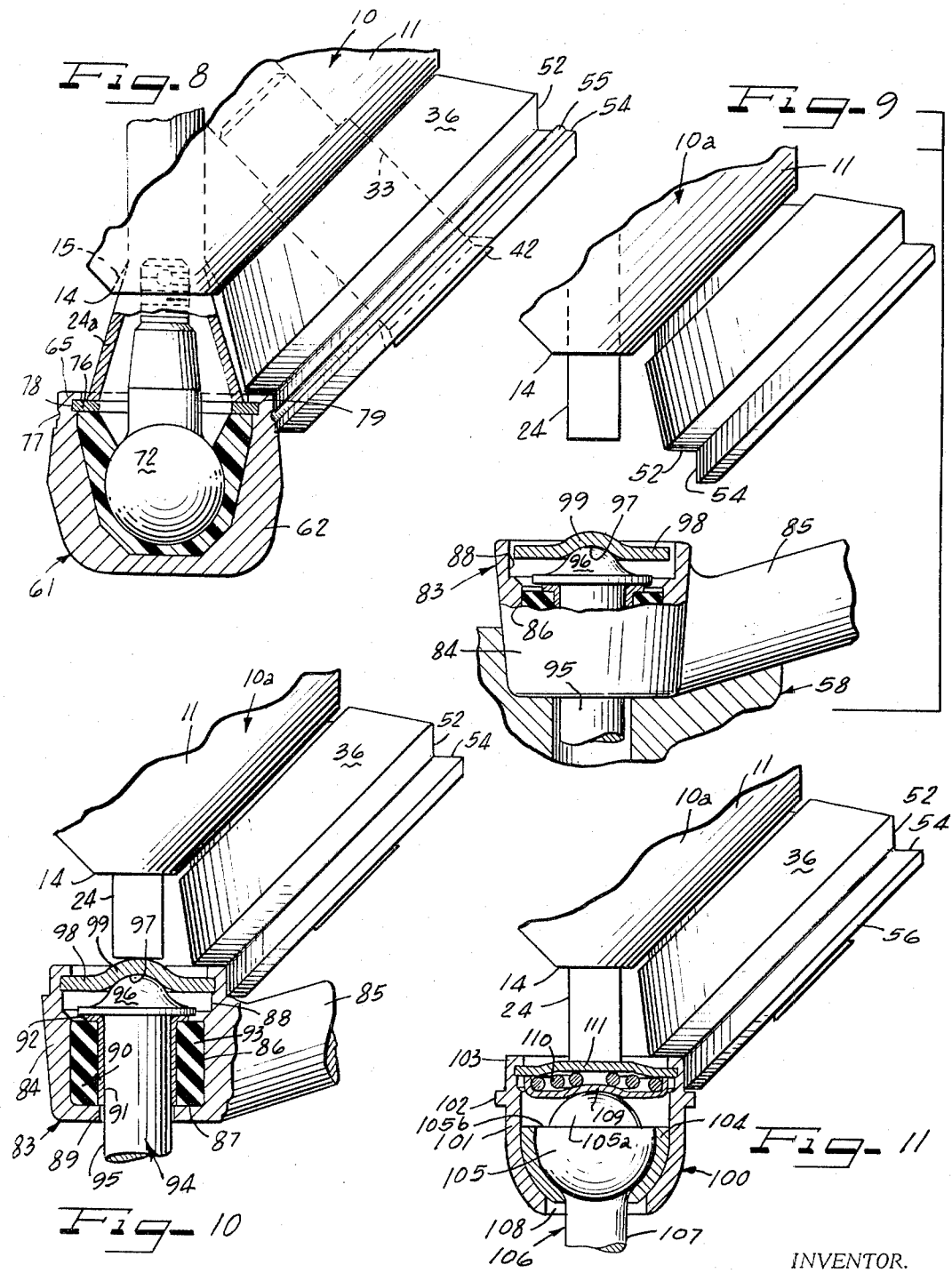
INVENTOR.
EDWARD J. HERBENAR
BY ATTORNEYS

United States Patent Office 3,395,442
Patented Aug. 6, 1968

3,395,442
METHOD FOR PRELOADING AND RETAINING COMPONENTS IN A HOUSING
Edward J. Herbenar, Detroit, Mich., assignor to TRW Inc., Cleveland, Ohio, a corporation of Ohio
Continuation-in-part of application Ser. No. 503,709, Oct. 23, 1965. This application Mar. 8, 1967, Ser. No. 621,561
4 Claims. (Cl. 29—441)

ABSTRACT OF THE DISCLOSURE

A method especially adapted for preloading joint components in a socket, locking a socket closure or component retainer at a position in the socket to maintain a desired preload on the components and obtaining the locked position for the retainer by deforming socket material over both faces of the retainer. The socket material can also be simultaneously deformed to provide a groove for anchoring a dust cover or boot on the socket. The tool used in the method has a rotating head with depending inclined studs carrying swedge rollers around the socket but sufficiently tilted to avoid contact with socket stems or the like.

RELATED APPLICATION

This application is a continuation-in-part of my copending application Ser. No. 503,709, filed Oct. 23, 1965, entitled "Method of Spin Swedging Inserts in Housings."

BACKGROUND OF THE INVENTION

Field of the invention

The invention pertains to the art of deforming metal around an insert, such as a retainer or closure plate in a housing, to provide a retaining groove without machining operations.

Description of the prior art

Heretofore, the locking retainers or closure plates in housings required machining operations to form retaining shoulders for the insert and peening or spinning operations to deform the metal over the retainer to hold it against the shoulder. The level of the retainer in the housing was, therefore, fixed by the position of the shoulder and variations in the stacking height of components in the housing prevented uniform loading of the components by the retainer. In my prior parent application Ser. No. 503,709, there is disclosed a spin swedge method which presses a closure plate for the housing into thrusting relation with joint components in the housing to develop a desired preload on the components and the closure plate is then locked in position at the level or depth in the housing for maintaining this preload by deforming the housing over both faces of the peripheral margin of the closure plate. The spin swedge rollers of the tool disclosed in the parent application are only slightly inclined from the vertical and have integral shanks projecting into cylindrical bores in the head of the tool to be rotatably supported therein on roller bearings. The tool could not accommodate work pieces having any upstanding projection.

The present invention now provides a spin swedge method which will load upstanding projections on work pieces, and form an external groove around the work piece while it locks a retainer in the work piece.

SUMMARY

The gist of the invention is to improve the spin swedge method of my parent application Ser. No. 503,709 to accommodate projections on the work piece and to lock a retainer member in the work piece simultaneously with the forming of a groove around the work piece which is adapted to anchor one end of a boot seal or dust cap.

An object of the invention is to provide a method of preloading retainer rings in joint sockets and deforming the socket to form a groove tightly embracing the ring.

Another object of the invention is to provide a method of simultaneously locking retainers in sockets and forming grooves around the sockets.

BRIEF DESCRIPTION OF THE DRAWINGS

FIGURE 1 is a side elevational view of a spin swedge tool used in the method of this invention acting on a joint socket having an upstandting ball stud projecting therefrom;

FIGURE 2 is a bottom plan view of the swedging tool of FIGURE 1;

FIGURE 3 is a cross-sectional view of the swedging tool taken along the line III—III of FIGURE 2 and further showing the joint socket of FIGURE 1 being acted upon by the tool;

FIGURE 4 is a vertical cross-sectional view, with parts in elevation, of the socket assembly shown in FIGURES 1 and 3 in the fiinished form after the tool has acted thereon and also showing the manner in which a dust cap is anchored in the peripheral groove formed by the tool;

FIGURE 5 is a fragmentary elevational view, with parts in vertical section, illustrating the relative positions of the tool and joint socket to be acted thereon prior to the loading of the joint components by the tool;

FIGURE 6 is a view similar to FIGURE 5, but illustrating the relative positions of the socket assembly and tool at the start of the swedging operation;

FIGURE 7 is a view similar to FIGURE 6, but showing the relative positions of the tool and socket assembly in an intermediate stage of the operation;

FIGURE 8 is a view similar to FIGURE 7, but illustrating the relative positions of the tool and socket assembly upon completion of the swedging operation;

FIGURE 9 is a view similar to FIGURE 5, but showing a different type of socket assembly about to be acted upon by the swedging tool;

FIGURE 10 is a view similar to FIGURE 9, but showing the relative positions of the tool and socket assembly upon completion of the swedging operation; and FIGURE 11 is a view similar to FIGURE 10, but illustrating the completion of the swedging operation on another form of socket assembly.

DESCRIPTION OF THE PREFERRED EMBODIMENTS

In FIGURES 1 to 3, the spin swedge apparatus or tool 10 includes a generally frusto-conical head or body 11 with a centrally recessed flat top 12 and an inclined bottom face 13 at the large end thereof which slopes from the periphery to a central apex 14 having a tapered recess 15 converging to a central cylindrical bore 16 extending vertically through the body 11.

The top 12 of the body 11 has a cylindrical well 17 with a counterbored large diameter top end 17a. A ball bearing unit 18 is mounted in the well 17.

A cap member 19 is bolted to the top end of the head 11 by mounting bolt 20 and has a pilot portion 19a seated in the counterbore 17a of the head.

The member 19 has an externally threaded stem 21 threaded into a chuck 22 of a drill press or the like driving spindle. A knurled ring 23, threaded on the stem 21, can be tightened against the bottom end of the chuck 22 to fix the vertical position of the tool 10 on a drill press, lathe or the like driving spindle.

A plunger rod 24 is slidably mounted in the bore 16 of the head 11 and is carried in the inner race of the bearing 18 so that the head may rotate freely around the rod without rotating the rod. The upper end of the rod 24 is threaded into a plunger 25 which is freely mounted in a central bore 26 of the member 19. The plunger 25 is reciprocated by any suitable actuating means (not shown), such as a hydraulic or pneumatic ram, or it can be spring loaded to exert a desired downward thrust on the rod 24. The rod 24 has a hollow or tubular bottom end with an outwardly flared frusto conical portion 24a converging to a cylindrical portion 24b terminating at an end 24c at a level in the bore 16. The small end of the frusto-conical portion can retract into the recess 15 and the open bottom large end of the portion projects freely below the bottom face 13 of the head 11 to surround an upstanding member of an assembly being acted upon by the tool and to engage the retainer of such an assembly.

The hollow cylindrical portion 24b of the rod 24 slidably supports a plunger or piston 27. The piston 27 has a closed top vertical slot 27a in the side wall thereof receiving a pin P projecting from the cylindrical rod portion 24b to retain the upper portion of the piston in the hollow cylindrical bore of the portion 24b while accommodating retraction of the bottom end of the piston from the hollow interior of the conical portion 24a into the bore. A compression spring S is positioned in the bore of the portion 24a and bottomed on the piston 27 and end 24c to urge the piston toward the conical end 24a.

The driving chuck 22 rotates the head 11, but the rod does not rotate therewith, being fitted freely in the head and adapted to be axially shifted under the action of the plunger 25.

The head 11 has three cylindrical bores 28 spaced 120° apart and extending up into the housing from the inclined end face 13 at a substantial angle, preferably 45°, from the axis of rotation of the head. Each bore 28 has a pair of counterbores 29 and 30 in the open bottom end thereof providing radial shoulders 31 and 32 respectively. Studs 33 have reduced diameter pilot end portions 34 pressfitted into the bores 28 and shoulders 35 bottomed against the shoulders 31 of the counterbores 29.

The studs 33 project beyond the end face or bottom 13 of the head 11 to provide rigid axles for swedge rollers 36. These rollers 36 have cylindrical central bores or recesses 37 extending from counterbores 38 in their top ends to tapered small diameter bores 39 at their bottom ends. Shoulders 40 are provided between the bores 37 and counterbores 38 while shoulders 41 are provided between the bores 37 and tapered bores 39. The tapered bores 39 flare outwardly or diverge from the radial inner peripheries of the shoulders 41. A washer or end cap 42 with a tapered periphery fitting the tapered bore 39 is secured to the end of each stud 33 by means of a mounting screw 43 and serves to retain the roller 36 on its stud 33.

A roller bearing cage assembly 44 is mounted in the bore 37 of each roller 36 to rotatably support the roller around the stud 33.

A radial bearing assembly 45, which may be any suitable antifriction radial bearing such as a needle bearing assembly, is seated in each counterbore 29 and bottomed against the shoulder 31.

A plurality of stacked Belleville spring washers are interposed between the radial bearing 45 and the shoulder 40 of each roller 36 to urge the roller against the washer or end cap 42 to hold it in spaced relation from the bottom face 13 of the head.

As shown, a first Belleville spring washer 46 has its inner peripheral portion bottomed against the bearing 45 and slopes radially outward and axially downward therefrom in the counterbore 30. A second Belleville spring washer 47 has its outer peripheral portion bottomed on the outer peripheral portion of the washer 46 in this counterbore 30 and then slopes radially inward and axially downward out of the counterbore. A third Belleville spring washer 48 has its inner peripheral portion engaging the inner peripheral portion of the washer 47 and then slopes radially outwardly and axially downward to be bottomed on the shoulder 40 of the counterbore 38. The stacked Belleville springs thus act as a helical spring or spring bellows around the stud 33 to urge the swedge roller 36 away from the head 11. These washers rotate with the roller, the rotation being accommodated by the bottom race of the radial bearing 45.

Each swedge roller 36 has a generally frusto-conical contour with a top tapered portion 49 diverging from a flat top end 50 containing the counterbore 38 to a base 51. A swedging contour is cut into each roller beyond this base 51 and includes an undercut shoulder 52 extending inwardly from the base 51 to an apex 53 and a second outwardly directed shoulder 54 extending from the apex at about a 90° angle to the shoulder 52. The shoulder 54 has a peripheral raised bead 55 about midway of its length and having a generally semicircular contour. The shoulder 54 terminates at a tapered rim 56 converging to the flat bottom face 57 of the roller. The swedging periphery provided by the shoulders 52 and 54 is so shaped and dimensioned in relation to the angle of inclination of the rollers so that the shoulder 52 will be oriented radially over the top of the work piece while the shoulder 54 will extend axially of the work piece in surrounding relation thereto and present the bead 55 in embracing relation to the work piece, as best shown in FIGURE 3.

The swedging tool 10 is especially adapted to act upon socket assemblies of the so-called "low-profile" type having a cup portion with a closed bottom and an open top through which a stud extends together with a laterally extending mounting stem at a level adjacent or even above the open top of the cup. In FIGURES 1 and 3, the tool 10 is illustrated as acting upon such a socket assembly and providing not only a central space accommodating the upstanding stud with the conical rod portion 24a freely surrounding the stud but also providing ample clearance for the stem.

As shown in FIGURES 1 and 3, a fixture 58 under the tool 10 has a cup-like recess 59 with a laterally extending recess 60. A socket assembly 61 has a cup end 62 seated in the recess 59 and a stem 63 extending from the cup end 62 and partially seated in the recess 60. The cup 62 has a closed bottom and an open cylindrical top with a straight cylindrical bore 64 in the open top defined by a generally upstanding cylindrical rim 65. The bore 64 extends inwardly from the open top for a considerable depth to a tapered bore 66 which converges to the closed bottom of the cup. A plastic bearing 67 is seated in this tapered bore and tiltably and rotatably supports a stud 68.

As better shown in FIGURE 4, the plastic bearing 67 is cup-shaped to snugly fit in the tapered bore 66 and has a spherical recess 69 opening into a diverging bore or mouth 70 which extends to a flat rim 71 at the top of the bearing.

The stud 68 has a full ball end 72 snugly seated in the spherical recess 69 of the bearing and a generally cylindrical stem 73 projecting freely through the mouth 70 and out of the open top of the housing. The stem 73 may be provided with a tapered wedge portion 74 for receiving an eye connection and a reduced diameter externally threaded top end portion 75 to receive a locking nut thereon (not shown).

The spherical recess 69 embraces substantially the entire ball end 72 of the stud, but the tapered bore 70 accommodates tilting of the stud in the bearing. The bearing is preferably composed of a molded block of suitable synthetic plastic material, such as nylon, polyethylene, polyurethane, or the like. This type of material is relatively rigid, but somewhat deformable and resilient. The bearing block 67 is molded to snugly fit the cavity of the cup 62 and to snugly embrace the ball end of the stud. The top rim 71 of the bearing 67 lies within the cylindrical bore 64 of the cup 62.

A retaining rigid washer 76, preferably composed of metal, fits loosely in the cylindrical bore 64 and is bottomed on the top rim 71 of the plastic bearing 67.

The swedge tool 10 of this invention preloads the socket assembly and locks the retaining washer 76 to the cup 62 as hereinafter described.

OPERATION

The manner in which the tool 10 acts upon the socket 61 to preload the assembly and to lock the retainer to the socket housing is illustrated in FIGURES 5 and 8.

In FIGURE 5, the tool 10 is shown in its position prior to engaging the socket assembly 61. In this position, both the plunger 24 and the swedge roller 36 are spaced from the socket assembly 61 so that the assembly is in its free unloaded condition. In this condition, the bearing block 67 has its flat top rim end 71 extending into the cylindrical bore 64 and the washer 76 fits loosely in this bore. The stud shank 73 projects into the conical end 24a of the rod 24 but has not yet been engaged by the piston 27 in the upper end of the conical portion. The swedging shoulder 52 of the roller 36 overlies the cylindrical rim end 65 of the cup 62 and the swedging shoulder 54 is adapted to embrace this cylindrical end 65.

From the starting position of FIGURE 5, the tool 10 is lowered to the position of FIGURE 6 with the swedging shoulder 54 surrounding the cylindrical end 65 of the cup and with the shoulder 52 spaced above the top rim edge of the cup. In this position, the stud shank 73 engages the piston 27 to compress the spring 5 which forces the stud inwardly into the bottom of the cup 62 to cause the stud to be "set" in place. The initial loading or "setting" of the stud by the piston 27 will first cause the bearing block to bottom in the cup 62 and take up clearance between the cup and bearing, such as the clearance indicated in FIGURE 5. The tapered bore 66 of the cup will contract the bearing block 67 as it is forced deeper into the cup, causing it to wrap around the ball end 72 of the stud and assume the position of FIGURE 6.

The plunger rod is then lowered to move the bottom rim of the conical portion 24a against the retainer 76 as shown in FIGURE 3. This load on the retainer is transferred to the bearing block 67 causing it to be depressed from its "set" or bottomed level of FIGURE 6 to a depth or level in the bore 64 controlled by the predetermined preload desired for the components. The bearing material itself will thus be compressed and all of the components preloaded to the desired stress.

The plunger rod 24 is actuated to produce the exact desired preload on the joint components and will establish this preload regardless of wide stack-up variations of the components.

When the desired preload has been placed on the joint components and they have reached their positions for sustaining this preload, the tool is next rotated and further lowered from the position of FIGURE 6 to the position of FIGURE 7. However, the plunger rod 24 is not further lowered to increase the preload unless such increase is desired.

As shown in FIGURE 7, the bead 55 forms a peripheral groove 77 around the upstanding cylindrical rim portion 65 of the cup 62 while the shoulder 54 cooperates with this bead 55 to radially deform the cylindrical portion 65 so that the bore 64 will tightly grip the periphery of the retaining ring or washer 76. In other words, the initial action on the cup 62 by the swedging rollers is a radial deformation of the housing portion 65 into tight gripping relation with the retainer 76.

After the housing has been deformed radially inward to clamp the periphery of the retainer 76, the tool 10 is further lowered to the position of FIGURE 8 where the radial deformation is continued by the swedging shoulder 54 and the bead 55 deepens the groove 77 to move the metal of the housing portion 65 into overlapping relation with both faces of the retainer 76 and, in effect, form a locking groove 78 for the retainer. The shoulder 52 acts on the rim edge of the housing and further deforms the metal to provide a flange 79 overlying the top face of the washer to a greater extent than the radially deformed metal underlies the bottom of the retainer.

It will be understood that as the head 11 of the tool is moved downwardly to cause the three swedge rollers to engage the open top of the cup 62, the swedge rollers are urged by the Belleville spring washers against the end caps 42 on the ends of the stud axles 33. Further lowering of the head 11 then moves the rollers 36 closer toward the axis of rotation of the head and into swedge gripping relation with the periphery of the housing as shown in FIGURE 7. This will stop the downward movement of the rollers and they will climb upwardly on the stud axles 33 thereby lifting off of the end heads or caps 42 as shown in FIGURE 7. This axial shifting of the rollers on their axles is accommodated by flattening of the bellows spring washers, and it should be understood that the bearing 44 rotatably mounting each roller on its axle is slidable on the main body portion of the axle.

Then, as the head 11 is further lowered from the position of FIGURE 7 to the position of FIGURE 8, the swedge rollers 36 will climb even higher on the axles 33.

It will, therefore, be understood that the head 11 is rotated to drive the three swedge rollers around an orbital path centered on the axis of rotation of the head. Each roller in turn may rotate about its own inclined axis determined by the angle of inclination of this axis. The rollers rotate freely on their stud axles and can also slide axially on these axles. When the rollers engage the work piece, their descent is arrested and further lowering of the head will force the studs further into the rollers. Since the studs are inclined, the orbiting radius of the rollers is decreased as the studs are forced through the rollers or as the rollers climb the studs, and a radial collapsing force is applied around the periphery of the work piece causing it to be spun inwardly and then overlapped on the retainer washer or ring. The rollers rotate by frictional engagement with the stationary work piece as the head rotates the inclined axles for the rollers.

The angle of inclination of the stud axles 33 is substantial to tilt the rollers away from the work piece and to provide a central space for receiving freely the hollow conical end of the plunger rod which in turn freely receives the stud of the work piece.

The groove 77 formed by the tool 10 during the spin swedging of the housing into locked relation with the retainer 76 may be used to anchor a dust cap or boot for the joint 61 on the housing 62 as shown in FIGURE 4. As therein shown, the boot 80, composed of rubber or the like elastomer, embraces the open top of the cup housing 62 and has an internal bead 81 seated in the groove 77. The boot also has an opening 82 through the dome thereof snugly embracing the shank of the stud.

OTHER MODIFICATIONS

If desired, as shown in FIGURES 9 to 11, the tool may be modified to spin swedge closure plates into the large open ends of open ended joint housings or the like. Thus, the tool 10a of FIGURES 9 to 11 has the same components and functions in the same manner as the tool 10, and similar parts have been marked with the same reference numerals. As shown, the rollers 36 do not have groove forming beads on their swedging periphery, but otherwise have the same swedging shoulders 52 and 54 as in the tool 10. The plunger rod 24 in the tool 10a does not have the hollow end or conical extension 24a, but its solid end projects beyond the apex 14 of the head 11.

The work piece illustrated in FIGURES 9 and 10 is a pin joint type of socket assembly 83, and includes an open ended eye housing 84 with a laterally extending stem 85. The housing has a cylindrical bore 86 extending from a radial shoulder 87 in the bottom thereof to an enlarged counterbore 88 which extends through the opening top end of the housing. A small diameter circular opening 89 is provided through the bottom of the housing. A rubber bushed bearing 90 is mounted in the bore 86 against the shoulder 87 and has a cylindrical sleeve 91 with an outturned top flange 92 surrounded by a rubber or other elastomer sleeve 93. The bearing sleeve 91 may be composed of any suitable bearing material such as metal, plastic or the like and may be split so as to be contracted under the load on the sleeve 93.

A pin stud 94 has a cylindrical shank 95 extending through the sleeve 91 and a head 96 overlying the flange 92 and having a rounded central dome 97. A closure plate or disk 98 closes the open top end of the housing 84 and has a domed central portion 99 providing a recess for the dome 97 of the head 96.

As shown in FIGURE 9, the components in the housing 84 have a stacked height such as to position the closure plate 98 just inside of the open top end of the housing. The closure plate 98 fits freely in the counterbore 88 and rests on the head dome 97.

To impart the proper preload to the components in the housing 83, the rod 24 is forced down on the dome or apex 99 of the closure disk 98 forcing the stud further into the housing and axially loading the elastomeric bushing 93. When the desired preload has been placed on the assembly, the head 11 is then lowered to bring the rollers 36 of the tool 11a into swedging engagement with the upstanding cylindrical rim portion of the housing 84 surrounding the counterbore 88. Then, the rim portion is radially deformed to move the wall of the counterbore 88 tightly around the periphery of the closure disk 98 and next to move the metal of the housing into overlapped relation with both faces of the closure disk and, in effect, form an internal groove clamping the closure disk. Since the open end of the housing is completely closed by the disk 98, there is no need for swedging or spinning a boot retaining groove around the periphery of the housing.

The joint assembly 83 is fitted into any suitable fixture 58a under the tool 10a and the pin joint shank 95 extends freely through a central aperture in this fixture instead of extending upwardly as in FIGURES 1 and 3.

In FIGURE 11, the work piece 100 is in the form of a ball and socket joint having an open ended cup-shaped housing 101 with a flange 102 therearound and an upstanding cylindrical rim portion 103 above this flange. The housing 100 supports a bearing 104 therein receiving the semi-ball end 105 of a stud 106 which has a cylindrical shank 107 extending through an opening 108 in the bottom of the housing.

The ball end 105 has a rounded button 105a thereof projecting from the central portion of the flat end 105b thereof. A dished retainer 109 is mounted in the housing over the button 105a and is urged thereagainst by means of a coil spring 110. A closure disk 111 pressed into the open top end of the housing by the plunger rod 24 compresses the spring 110 to exert the desired preload on the joint components in the housing. When the closure disk 111 has been forced in the housing to a sufficient depth for compressing the spring 110 to create the desired preload on the joint component, the tool head 11 is lowered bringing the swedge rollers, such as 36, into spin swedge engagement with the cylindrical rim portion 103 of the housing. Then the rim portion is first radially collapsed into tight gripping engagement with the closure plate periphery and next the metal of the rim portion is moved into overlapping and underlapping relation with the closure plate to form an internal groove tightly clamping the periphery of this closure plate. It will be noted from FIGURE 11 that the flange 102 of the joint housing 101 does not interfere with the spin swedging operation since the angle of inclination of the roller 36 is sufficient, together with the inclined taper 56 of the roller, to maintain the roller away from the flange during the swedging operation.

Although minor modifications might be suggested by those versed in the art, it should be understood that I wish to embody within the scope of the patent granted hereon, all such modifications as reasonably and properly come within the scope of my contribution to the art.

I claim as my invention:

1. The method of making a preloaded ball joint assembly which comprises providing a closed bottom, open top, cup-shaped housing with a cylindrical bore at the open end thereof and a tapered bore extending from the cylindrical bore to the bottom of the housing, inserting the ball end of a ball stud into a plastic bearing block having a spherical recess for embracing the ball end and open mouth providing access to said recess, inserting the stud and bearing assembly into the housing with the upper end of the bearing positioned in the cylindrical bore of the housing, depositing a retainer washer in the cylindrical bore of the housing in free fitting relation therewith on top of the bearing, axially loading the stud to force the stud and bearing into the bottom of the housing, axially loading the retainer washer against the bearing, moving the washer into the housing to a level assumed by the preloaded assembly, spin swedging the housing locally around the area thereof opposite the retaining washer to first radially collapse the cylindrical bore into tight gripping relation with the periphery of the washer and to next move material of the housing into overlapped and underlapped relation with both faces of the retainer thereby fixing the retainer to the housing, while simultaneously forming an external groove around the housing adapted to anchor a dust seal to the housing.

2. The method of preloading components in a housing and locking the components in the preloaded condition which comprises inserting components in a housing having an open end adapted to receive the components, projecting a portion of one of said components through said open end of the housing, inserting a retainer in said ope end of the housing and around the portion of the component projecting through said open end in free-fitting relation therewith and with the housing, exerting a thrust on the projecting portion of said one component to position the component in the housing, forcing the retainer into the housing to develop a pre-determined load on the components, spin-swedging the housing radially inwardly locally around the retainer into tight-gripping relation with the periphery of the retainer and then flowing housing material over and under both faces of the retainer to form an internal groove in the housing clamping the retainer in fixed position.

3. The method of forming a pre-loaded joint socket assembly having a stud with a shank projecting from the socket which comprises inserting joint components into a socket having an open end with the stud shank projecting through said end, inserting a retainer into the open end of the socket and around the stud shank in free-fitting relation therewith and with the socket, exerting an axial thrust on the retainer to pre-stress said components in the socket to a desired load, moving the retainer to a depth in the socket for engaging the components to maintain said load, spin-swedging the socket radially inwardly locally around the retainer at said depth to form an internal groove in the socket fixedly locking the retainer to the socket and simultaneously forming a socket seal receiving groove circumferentially around the socket and opposite the internal groove.

4. The method of spin swedging a retainer ring in a joint housing containing joint components while simultaneously preloading the components in the housing which comprises stacking joint components in a housing having an open end with one of the components projecting through said open end, inserting a freely fitting retainer ring in the housing around the projecting portion of said one component and resting on the stack, axially loading the retainer to develop a pre-determined preload on all of the components in the housing, spin swedging the housing radially inwardly locally around the axially loaded retainer ring to form an internal groove clamping the retainer ring in fixed relation to the housing and simultaneously forming a housing seal receiving groove circumferentially around the housing.

References Cited
UNITED STATES PATENTS

| | | |
|---|---|---|
| 1,899,645 | 2/1933 | Sneed. |
| 2,027,560 | 1/1936 | Skillman _____ 287—90 |
| 2,329,770 | 9/1943 | Knox _____ 29—511 |
| 2,651,488 | 9/1953 | Sauer. |
| 2,855,665 | 10/1958 | Aldredge _____ 29—441 |
| 3,067,709 | 12/1962 | Conti et al. _____ 29—511 |

CHARLIE T. MOON, *Primary Examiner.*